(12) United States Patent
Hidalgo et al.

(10) Patent No.: US 8,629,213 B2
(45) Date of Patent: Jan. 14, 2014

(54) COMPOSITION INCLUDING A MIXTURE OF ELASTOMER AND SUPRAMOLECULAR POLYMER

(75) Inventors: Manuel Hidalgo, Brignals (FR); Christelle Plaut, Irigny (FR); Alfredo Defrancisci, Lyons (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/496,264

(22) PCT Filed: Sep. 21, 2010

(86) PCT No.: PCT/FR2010/051957
§ 371 (c)(1), (2), (4) Date: May 18, 2012

(87) PCT Pub. No.: WO2011/036388
PCT Pub. Date: Mar. 31, 2011

(65) Prior Publication Data
US 2012/0220725 A1 Aug. 30, 2012

(30) Foreign Application Priority Data

Sep. 23, 2009 (FR) ...................................... 09 56565

(51) Int. Cl.
*C08L 79/04* (2006.01)
*C08L 7/00* (2006.01)
*C08L 9/00* (2006.01)
*C08L 21/00* (2006.01)
*C08G 69/48* (2006.01)

(52) U.S. Cl.
USPC .............. 525/189; 525/60; 525/92 A; 525/93; 525/94; 525/96; 525/98; 525/190; 524/503; 524/505; 524/539

(58) Field of Classification Search
USPC ......... 525/60, 92 A, 93, 96, 98, 186, 94, 190; 524/503, 505, 539
See application file for complete search history.

(56) References Cited

U.S. PATENT DOCUMENTS

| 2007/0123694 A1 | 5/2007 | Tournilhac |
| 2009/0062551 A1 | 3/2009 | Tournilhac |
| 2009/0085444 A1* | 4/2009 | Alvarez Icaza Rivera et al. .............................. 310/365 |
| 2010/0135940 A1 | 6/2010 | Grimaldi |
| 2010/0305334 A1 | 12/2010 | Tournilhac |

FOREIGN PATENT DOCUMENTS

| FR | 2925505 A1 | 6/2009 |
| WO | WO-03059964 A2 | 7/2003 |
| WO | WO-2006087475 A1 | 8/2006 |
| WO | WO-2008029065 A2 | 3/2008 |
| WO | WO-2009071554 A1 | 6/2009 |

OTHER PUBLICATIONS

International Application Serial No. PCT/FR2010/051957, International Search Report mailed Jan. 21, 2011, 3 pgs.
Cordier, Philippe, "Self-healing and Thermoreversible Rubber from Supramolecular Assembly", Nature Publishing Group, vol. 451, (Feb. 21, 2008), 977-980.
Montarnal, Damien, "Versatile One-Pot Synthesis of Supramolecular Plastics and Self-Healing Rubbers", J. Am. Chem, Soc., vol. 131, (May 20, 2009), 7966-7967.

* cited by examiner

*Primary Examiner* — Fred M Teskin
(74) *Attorney, Agent, or Firm* — RatnerPrestia

(57) ABSTRACT

The invention relates to a composition including at least one elastomer and at least one supramolecular polymer. The supramolecular polymer is obtained by the reaction of at least one trifunctional compound (A), having first and second functions, with: at least one compound (B) having at least one reactive group capable of reacting with the first functions of (A) and at least one associative group; and at least one at least bifunctional compound (C) having functions capable of reacting with the second functions of compound (A) in order to form ester, thioester and amide bridges.

20 Claims, No Drawings

COMPOSITION INCLUDING A MIXTURE OF ELASTOMER AND SUPRAMOLECULAR POLYMER

This is a U.S. National Phase application of International application number PCT/FR2010/51957, filed Sep. 21, 2010, which claims priority benefit of FR 0956565, filed Sep. 23, 2009 (both of which are incorporated herein by reference in their entirety for all purposes)

FIELD OF THE INVENTION

The present invention relates to compositions based on elastomers and on supramolecular polymers, said compositions being optionally chemically crosslinked, and to the use thereof in numerous industrial fields.

BACKGROUND OF THE INVENTION

"Supramolecular" materials are materials comprising compounds that are associated via noncovalent bonds, such as hydrogen, ionic and/or hydrophobic bonds. One advantage of these materials is that these physical bonds are reversible, in particular under the influence of temperature or through the action of a selective solvent.

Some of them also have elastomer properties. Unlike conventional elastomers, these materials have the advantage of being able to become fluidized above a certain temperature, thereby facilitating processing thereof, in particular the correct filling of molds, and also recycling thereof.

Moreover, some of these supramolecular polymers consist of molecules bonded in networks exclusively via reversible physical bonds. Despite the relatively modest physical bonding forces of the molecules of such a supramolecular network, these materials are, like classical or conventional elastomers, capable of exhibiting dimensional stability over very long periods of time and of regaining their initial shape after considerable strains. They can be used for manufacturing, for example, leaktight seals, thermal insulating materials, soundproofing materials, tires, cables, sheaths, soles for footwear, packaging, patches (cosmetic or dermopharmaceutical), dressings, flexible hose clips, vacuum tubes, or else pipes and flexible hoses for conveying fluids.

Supramolecular materials have already been described by the applicant. More particularly, the applicant has already described supramolecular materials having the behavior of elastomers.

A self-healing elastomeric supramolecular material is, moreover, disclosed in document WO 2006/087475. It comprises molecules containing at least three associative functional groups, such as imidazolidone groups, capable of forming several physical bonds and which can be obtained by reacting urea with the product of the reaction of a polyamine with triacids. The materials obtained according to the teachings of documents WO 03/059964 and WO 2006/087475 contain triacids which are covalently linked, via amide functions, to intermediate junctions and/or to end groups, consisting of the product of reacting polyamine with urea and which therefore contain many associative groups, i.e. containing N—H and C=O functions capable of associating with one another via hydrogen bonds. Specifically, the publication by P. Cordier, L. Leibler, F. Tournilhac and C. Soulie-Ziakovic in *Nature*, 451, 977 (2008) mentions that a polymer synthesized according to the procedure described in document WO 2006/087475 comprises amidoethyl-imidazolidone end groups and di(amidoethyl)urea and diamidotetraethyl triurea junctions. It is understood that, owing to the process for synthesizing these materials, the chemical natures of the abovementioned junctions and end groups are interdependent, in the sense that it is not possible to vary the nature of the amidoethylimidazolidone end group without affecting that of the two junctions.

The document entitled "Versatile One-Pot Synthesis of Supramolecular Plastics, and Self-Healing Rubbers" by Damien Montarnal, François Tournilhac, Manuel Hidalgo, Jean-Luc Couturier, and Ludwik Leibler published in "Journal of the American Chemical Society", 131 (23): 7966, on Jun. 17, 2009, describes an alternative process for obtaining supramolecular polymers, including those having elastomeric properties of the type of those of the publication by P. Cordier et al. This method makes it possible, inter alia, to break the interdependence of the chemical natures between the junctions and the end groups of the supramolecular network. It thus becomes possible to control the chemical nature of the end groups independently of that of the junctions.

These new self-healing polymers have enormous advantages, such as those of being readily processable, resulting predominantly from renewable raw materials, and of being self-repairing. However, their mechanical properties remain insufficient for many applications of rubbers, in which, in particular, a good balance of the mechanical properties is required. Thus, the self-healing supramolecular polymers described in the prior art exhibit mediocre cold resistance owing to their relatively high glass transition temperature, Tg (close to ambient temperature), low break properties (tensile strength and elongation at break), and slow elastic springbacks after strain.

Some of these faults can be erased by virtue of the formulation, as is widely known to those skilled in the art, in particular by adding fillers such as calcium carbonate, silica or carbon black, or plasticizers, oils and the like. Optionally, these self-healing polymers can also be slightly chemically crosslinked, for example with peroxides. However, the formulation (fillers, plasticizers, oils and the like) and the chemical crosslinking of these new polymers have their limits and are generally reflected by a notable loss of properties, for instance the self-repairing capacity. Thus, for example, although it is possible to increase the tensile strength of a self-healing supramolecular polymer, by adding fillers, this does not have a favorable effect on the cold resistance and the increase in tensile strength remains modest owing to a low filler content necessary in order to preserve optimum self-repair.

SUMMARY OF THE INVENTION

The applicant has now found a way to improve the properties of these new self-repairing supramolecular polymers by developing a composition comprising these polymers in combination with conventional elastomers, among which mention may be made of the natural or synthetic rubbers that have been known for a long time, or thermoplastic elastomers. Such a composition may comprise fillers, plasticizers and the like and also be combined with crosslinking systems.

More specifically, the subject of the present invention is a composition comprising:
 (i) at least one elastomer which is selected from natural rubber and a synthetic polymer or copolymer resulting from the polymerization of a majority of monomers with a molecular weight of less than 400 g/mol; and
 (ii) at least one supramolecular polymer obtainable by reacting at least one at least trifunctional compound (A) bearing first and second functions, with:

at least one compound (B) bearing, firstly, at least one reactive group capable of reacting with the first functions of (A) and, secondly, at least one associative group; and at least one at least bifunctional compound (C) of which the functions are capable of reacting with the second functions of compound (A) in order to form ester, thioester and amide bridges.

The inventors have shown that the compositions which are the subject of the invention comprise elastomers and supramolecular polymers which exhibit an excellent balance of properties. In particular, the inventors have shown that these mixtures make it possible to notably improve the properties of the supramolecular polymers and to remedy their main faults already mentioned, such as the low tensile strength values, and/or their poor cold resistance and/or also their speed of recovery from strain, when mechanically stressed. Furthermore, the self-repairing properties of the self-healing supramolecular polymers can be retained in these mixtures. Thus, compositions in accordance with the invention exhibit both self-repairing properties and also an excellent balance between tensile strength and elongation at break or a fracture energy which is significantly improved compared with that of the supramolecular polymers used alone.

The inventors have also shown (Example 1) that the compositions in accordance with the invention comprising a mixture of elastomer and elastomeric supramolecular polymer have better breaking strength mechanical properties than each of the components considered in isolation.

The compositions in accordance with the invention comprising a mixture of supramolecular polymer with a conventional elastomer provide improvements, not only when said mixture is thermodynamically compatible, i.e. when the two components form just one phase in the mixture containing them, but also when said mixture is not compatible and the mixture is a two-phase or multi-phase mixture. The applicant has thus found that the mixtures of supramolecular polymers with conventional elastomers make it possible to obtain advantageous balances of the properties over the entire range of compositions of the mixtures, despite the presence in certain mixtures of at least 2 phases reflecting a thermodynamic incompatibility between the two types of elastomers.

DETAILED DESCRIPTION OF THE INVENTION

By way of preamble, it will be noted that the expression "included between" should be interpreted, in the present description, as including the limits mentioned.

Elastomers

The elastomers of the present invention are rubber (or elastomeric) polymers which have one or more glass transition temperature(s) below their use temperature, in other words materials that are relatively flexible at the use temperature, having at least one typical property of rubber elasticity, such as a springback after considerable strains (typically greater than 100%), an isochoric or constant-volume deformation reflected by a Poisson's ratio with the value of 0.5 or a tensile curve typical of an elastomer, as can be found in the literature, such as in the book *Mécanique de matériaux polymères* [Mechanics of polymer materials] by J. L. Halary, F. Laupretre and L. Monnerie, publisher Belin, collection Echelles. c. 2008 (for example in chapters 1 and 13). Those skilled in the art know these properties under names such as hyperelasticity, rubber elasticity or entropic elasticity. Such materials preferably have a Young's modulus, measured at the use temperature, included between 1000 Pa and 100 000 000 Pa, and preferably included between 50 000 Pa and 50 000 000 Pa. They also exhibit strains at break that are greater than 20% and preferably greater than 100%.

Preferably, the elastomers of the present invention have the property of being able to be subjected to a uniaxial strain at the use temperature, for example at ambient temperature, of at least 20%, for example for 15 minutes, and of regaining, once this stress is released, essentially the initial dimension thereof, for example with a set of less than 5% of the initial dimension thereof.

These elastomers are either of natural origin, such as the elastomeric polymer materials resulting from the exploitation of natural latex, or of synthetic origin, such as the polymers and copolymers obtained by chain, catalytic or step polymerization, involving a majority of monomers with a low molecular weight, typically less than 400 g/mol, or even less than 300 g/mol. Both the elastomers resulting from natural latex and the synthetic elastomeric polymers can also be chemically modified via functionalization reactions on the previously formed polymer chains. Thus, for example, halogenated elastomers can be obtained by total or partial halogenation of the double bonds still present in the polymer chains. Similarly, certain hydrogenated elastomers are obtained via reactions in which these remaining double bonds are partially or totally hydrogenated.

Among the elastomers used for preparing the materials of the invention, mention may be made, as nonexclusive examples, of natural rubber, polybutadiene, synthetic polyisoprene, polychloroprene and their hydrogenated versions, polyisobutylene, block copolymers of polybutadiene and of isoprene with styrene, and also their hydrogenated versions, such as poly(styrene-b-butadiene, (SB), poly(styrene-b-butadiene-b-styrene) (SBS), poly(styrene-b-isoprene-b-styrene) (SIS), poly(styrene-b-(isoprene-stat-butadiene)-b-styrene) or poly(styrene-b-isoprene-b-butadiene-b-styrene) (SIBS), hydrogenated SBS (SEBS), poly(styrene-b-butadiene-b-methyl methacrylate) (SBM), and also its hydrogenated version (SEEM), poly(methyl methacrylate-b-butyl acrylate-b-methyl methacrylate) (MAM), poly(styrene-b-butyl acrylate-b-styrene) (SAS), random copolymers of butadiene with styrene (SBR) and acrylonitrile (NBR) and their hydrogenated versions, butyl or halogenated rubbers, polyethylenes, polypropylenes, silicone elastomers of general formula —(Si(R)(CH$_3$)—O)$_n$— with CH$_3$ and R bonded to the silicon atom and the latter bonded to the oxygen atom, and it being possible for R to be a methyl, phenyl, vinyl, trifluoropropyl or 2-cyanoethyl radical, ethylene-vinyl alcohol copolymers, ethylene-propylene and ethylene-propylene-diene copolymers, copolymers of ethylene with acrylic and vinyl monomers, such as copolymers of ethylene and vinyl acetate, copolymers of ethylene, vinyl acetate and maleic anhydride, which are available from the company Arkema under the trade name Orevac®, copolymers of ethylene and acrylic ester, copolymers of ethylene, acrylic ester and maleic anhydride, copolymers of ethylene, acrylic ester and functional acrylic ester, such as glycidyl acrylate or methacrylate, which are available from the company Arkema under the trade name Lotader®, flexible acrylic polymers or copolymers, for instance resins based on methacrylic esters, such as poly (butyl acrylate) and copolymers thereof with styrene, or other acrylic or vinyl monomers, polyamide/polyether multiblock copolymers such as those available from the company Arkema under the name Pebax®, elastomers based on polyesters and on polyurethane (PUR), recycled rubbers based on thermoplastic elastomers or based on recycled crosslinked rubber, such as the product resulting from the recycling of tires, and also blends thereof.

Preferentially, one or more elastomers chosen from the list below, which are advantageously suitable for the manufacture of rubber objects, is (are) used as an elastomer.

Preferably, the elastomer according to the invention may comprise one or more crosslinked or noncrosslinked diene elastomers which are verging or result from one or more recyclings. The term "diene elastomers" is intended to mean more specifically:

(1) homopolymers obtained by polymerization of a conjugated diene monomer containing from 4 to 22 carbon atoms, for instance: 1,3-butadiene, 2-methyl-1,3-butadiene, 2,3-dimethyl-1,3-butadiene, 2,3-diethyl-1,3-butadiene, 2-methyl-3-ethyl-1,3-butadiene, 2-chloro-1,3-butadiene, 2-methyl-3-isopropyl-1,3-butadiene, 1-phenyl-1,3-butadiene, 1,3-pentadiene or 2,4-hexadiene;

(2) copolymers obtained by copolymerization of at least two of the abovementioned conjugated dienes with one another or by copolymerization of one or more of the abovementioned conjugated dienes with one or more ethylenically unsaturated monomers chosen from:
vinyl aromatic monomers having from 8 to 20 carbon atoms, such as, for example: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene;
vinyl nitrile monomers having from 3 to 12 carbon atoms, such as, for example, acrylonitrile or methacrylonitrile;
acrylic ester monomers derived from acrylic acid or methacrylic acid with alkanols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate;
the copolymers can contain between 99 and 20% by weight of diene units and between 1% and 80% by weight of vinylaromatic, vinyl nitrile and/or acrylic ester units;

(3) ternary copolymers obtained by copolymerization of ethylene and of an α-olefin having from 3 to 6 carbon atoms with a nonconjugated diene monomer having from 6 to 12 carbon atoms, such as, for example, the elastomers obtained from ethylene and propylene with a nonconjugated diene monomer of the abovementioned type, such as, in particular, 1,4-hexadiene, ethylidene norbornene or dicyclopentadiene (EPDM elastomer);

(4) copolymers obtained by copolymerization of isobutene and isoprene (butyl rubber), and also the halogenated, in particular chlorinated or brominated, versions of these copolymers;

(5) a blend of several of the abovementioned elastomers (1) to (4) with one another.

The polymers that can be used according to the invention can be obtained according to conventional polymerization techniques well known to those skilled in the art.

In one embodiment of the invention, the elastomer comprises or consists exclusively of recycled elastomeric polymers, which are either thermoplastic polymers or recycled crosslinked rubber polymers. In this respect, mention may be made, by way of example, of the rubbers resulting from the industry for recycling crosslinked rubber materials, such as those which are used to manufacture tires.

Furthermore, since it is a formulated recycled rubber, it will contain, before blending, fillers that will be part of the final mixture. According to one preferred embodiment, the recycled conventional rubber results from the recycling of tires.

Chemical crosslinking makes it possible to improve the properties of the composition which is the subject of the invention.

Thus, the composition which is the subject of the invention may be chemically crosslinked and may comprise, in addition to the elastomer and the supramolecular polymer, at least one crosslinking agent or a mixture of crosslinking agents.

There are numerous methods for chemically crosslinking elastomer materials, among which, the most commonly used are those based on sulfur-containing compounds, which are useful for crosslinking elastomer materials containing unsaturations in their main chains, such as natural or synthetic polyisoprene, polybutadiene or polychloroprene, and copolymers thereof, in particular with styrene, acrylonitrile and acrylic monomers. The sulfur is capable of forming monosulfide, disulfide or polysulfide bridges between two chains, by reaction with unsaturations initially present in said chains.

Thus, the crosslinking agent may be chosen from sulfur, preferably in powder form, and sulfur-donating compounds, metal oxides, bismaleimides and benzoquinone derivatives. By way of example of crosslinking agents, mention may be made of sulfur, dimorpholine disulfide, alkyl phenol disulfide, zinc and magnesium oxides, benzoquinone dioxime and m-phenylenebismaleimide.

Another very commonly used method is that of chemically crosslinking with peroxides which, by means of radical reactions, tear off H• radicals from the polymer chains, which are then capable of combining together via the recombination of the C• radicals thus created.

Among the peroxides that can be used for the invention, mention may be made of those of the alkyl peroxide family, such as, for example, 1,3 1,4-bis(tert-butylperoxyisopropyl) benzene, dicumyl peroxide, tert-butylcumyl peroxide, 2,5-dimethyl-2,5-di-(tert-butylperoxy)hexane or di-(tert-butyl) peroxide, those of the perketal family, such as, for example, n-butyl-4,4'-di(tert-butylperoxy)valerate, 1,1'-di(tert-butylperoxy)-3,3,5-trimethylcyclohexane, 1,1-di(tert-butylperoxy) cyclohexane, di-tert-butyl diperoxide and 1,1,4,4-tetramethylbut-2-yn-1,4-ylene, those of the diacyl peroxide family, such as, for example, dibenzoyl peroxide, and those of the peroxycarbonate family, such as, for example, OO-tert-butyl O-(2-ethylhexyl) monoperoxycarbonate.

Industrial methods for the chemical crosslinking of elastomers involve more or less complex formulations in which may be found, for example, in addition to the main crosslinking agents, such as sulfur or peroxides, accelerators, retardants, synergists, fillers, heat stabilizers and radiation stabilizers, short-stoppers or moderating agents.

Nonaccelerated crosslinking with sulfur is not very widely used owing to the progressive development of fast-acting or delayed-action accelerators or activators. Among these agents, mention may be made of amines, such as, for example, aniline, diphenylguanidine or di-ortho-tolylguanidine, thiocarbanilides, dithiocarbamates, such as, for example, tetramethylthiuram monosulfide, tetramethylthiuram disulfide or zinc diethyldithiocarbamate, benzothiazoles, such as 2-mercaptobenzothiazole or 2,2'-dithiobisbenzothiazole, and benzothiazolesulfenamides, such as N-cyclohexylbenzothiazole-2-sulfenamide, N-t-butylbenzothiazole-2-sulfenamide, 2-morpholinothiobenzothiazole or N-dicyclohexylbenzothiazole-2-sulfenamide.

For example, by way of vulcanization aids, mention may be made of:

Fatty acids, such as propionic acid, acrylic acid, maleic acid or stearic acid, and metal salts thereof, such as zinc stearate, zinc butanoate, zinc acrylate or zinc maleate.

Processes which are Subjects of the Invention

A subject of the invention is also a process for producing a composition, said process comprising:
- at least one step (a) of mixing an elastomer and a supramolecular polymer as defined above; and
- at least one step (b) of adding a crosslinking agent or a mixture of crosslinking agents, said step being carried out during or after step (a); then
- a hot-crosslinking step (c).

Preferably, step (a) is carried out under mechanical shear and temperature conditions such that the mixture can be made homogeneous to the eye, and, in particular, in conversion machines which are customary for those skilled in the art, for instance mixers, including internal mixers, extruders, calendering machines, static presses, injection presses, or any other type of machine commonly used for mixing polymers.

The hot-crosslinking step (c) is carried out by increasing the temperature of the mixture obtained in step (b) up to the crosslinking temperature.

This crosslinking temperature is maintained for period of time sufficient for the mixture to be crosslinked.

The crosslinking temperature and crosslinking time are chosen according to the crosslinking system used. Moreover, the crosslinking system (crosslinking agents, accelerators, retardants, etc.) is chosen such that the majority of the crosslinking occurs during this crosslinking step (c), at the crosslinking temperature and during the crosslinking time, and not before. It is thus preferable to incorporate the components of the crosslinking system into the mixture at a temperature below the crosslinking temperature, and to increase the temperature when it is desired to initiate the crosslinking. The crosslinking step (c) is carried out, for example, in a mold, with or without pressure, or on a support. The crosslinking temperature is also determined such that the crosslinking can be carried out in a time that is suitable and appropriate for the molding or depositing technique selected. Particularly preferably, this crosslinking temperature is included between 100 and 200° C.

The crosslinking agent and, generally, all the additives selected, such as plasticizers, inorganic or organic fillers, stabilizers, etc., can alternatively be added before step (a). In this case, said crosslinking agent and/or said additives can be added to the elastomer or to the supramolecular polymer used in the composition which is the subject of the invention, before mixing thereof during step (a). In this case, it is preferable for the maximum temperature reached during the mixing step (a) to remain below the crosslinking temperature that will be set during the crosslinking step (b).

A subject of the invention is therefore also a composition comprising at least one supramolecular polymer and at least one crosslinking agent, said composition being intended to be subsequently mixed with an elastomer.

A subject of the invention is also the use of a crosslinking agent for crosslinking a composition comprising a mixture of elastomer and supramolecular polymer, and also the crosslinked mixture itself.

Said crosslinking agent can be used alone or as a mixture with other crosslinking agents, and optionally accelerators or retardants, synergists or any other additive which is usually part of systems of crosslinking since it plays a role with respect to the kinetics or the mechanism thereof.

Supramolecular Polymers

The reagents employed for producing the supramolecular materials used in the composition according to the invention will now be described in greater detail.

As indicated above, the supramolecular polymer is obtainable by reacting at least one at least trifunctional compound (A) bearing first and second functions, with:
- at least one compound (B) bearing, firstly, at least one reactive group capable of reacting with the first functions of (A) and, secondly, at least one associative group; and
- at least one at least bifunctional compound (C) of which the functions are capable of reacting with the second functions of compound (A) in order to form ester, thioester or amide bridges.

The term "associative groups" is intended to mean groups capable of associating with one another via hydrogen bonds, advantageously via 1 to 6 hydrogen bonds. Examples of associative groups that can be used are imidazolidinyl, triazolyl, triazinyl, bisureyl and ureidopyrimidyl groups. The average number of associative end groups per molecule of the supramolecular polymer is preferably at least 3. It is advantageously at least 6. Said groups are linked covalently to the molecule. The term "covalently" is intended to mean that the associative groups are linked to the end functions of the molecule either via a direct bond or, preferably, via a chain, in particular an alkylene chain.

The term "reactive groups" or "functions" is intended to mean chemical functions capable of reacting with other chemical functions so as to form covalent bonds, resulting in particular in the formation of ester, thioester, amide, urea or urethane bridges, and in particular of ester and amide bridges. A "bifunctional" compound denotes a compound bearing two identical or different reactive functions. An "at least trifunctional" compound denotes a compound bearing at least three identical or different reactive functions.

For the purpose of the invention, the term "fragment" is intended to mean a unit of a molecule located between two or three bridges as defined above. A "bifunctional" fragment is obtainable from a bifunctional compound, and a "trifunctional" fragment is obtainable from a trifunctional compound. The molecules of the supramolecular polymer comprise fragments which are at least bifunctional, advantageously bifunctional, and fragments which are at least trifunctional, advantageously trifunctional.

Preferably, compound (A) represents more than 50% by weight relative to the total weight of the supramolecular polymer.

Compound (A) used in the first step of the process for synthesizing the supramolecular polymer can in particular bear at least three identical or different functions chosen from acid, ester or acyl chloride functions. It advantageously comprises from 5 to 100, preferably from 12 to 100 and more preferentially from 24 to 90 carbon atoms.

Compound (A) can, when it is brought to react with compound (B) and/or compound (C), be in a mixture with mono- and bifunctional compounds, such as mono- and diacids, in particular fatty acid mono- and dimers.

According to the invention, use is preferably made, as compound (A), of mixtures of dimers (oligomers of 2 identical or different monomers) and trimers of fatty acids of plant origin. These compounds result from the oligomerization of unsaturated fatty acids such as undecylenic acid, myristoleic acid, palmitoleic acid, oleic acid, linoleic acid, linolenic acid, ricinoleic acid, eicosenoic acid and docosenoic acid, which are customarily found in pine oil (tall oil fatty acids), rapeseed oil, corn oil, sunflower oil, soya oil, grapeseed oil, linseed oil and jojoba oil, and also eicosapentaenoic acid and docosahexaenoic acid, which are found in fish oils.

Compound (A) may be a mixture of a trimer of a fatty acid and of diacids chosen from a linear alkyldicarboxylic acid, such as glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid or octadecanedioic acid, or a branched alkyl dicarboxylic acid such as 3,3-dimethylglutaric acid.

As examples of fatty acid trimers, mention may be made of the compounds having the following formulae which illustrate the cyclic trimers resulting from fatty acids containing 18 carbon atoms, in the knowledge that the commercially available compounds are mixtures of steric isomers and positional isomers of these structures, which are optionally partially or totally hydrogenated.

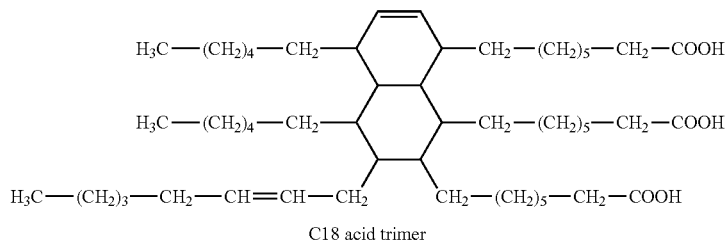

C18 acid trimer

Use may thus be made of a mixture of oligomers of fatty acids containing dimers, trimers and monomers of linear or cyclic $C_{18}$ fatty acids, said mixture being predominantly of dimers and trimers and containing a low percentage (usually less than 5%) of monomers. Preferably, said mixture comprises:

from 0.1 to 40% by weight, preferably from 0.1 to 5% by weight, of monomers of fatty acids which are identical or different, from 0.1 to 99% by weight, preferably from 18 to 85% by weight of dimers of fatty acids which are identical or different, and from 0.1 to 90% by weight, preferably from 5 to 85% by weight, of trimers of fatty acids which are identical or different.

Even more preferably, said mixture of fatty acid-derived molecules has an average molecular weight greater than 400 g/mol.

As examples of mixtures of dimers/trimers of fatty acids (% by weight), mention may be made of:

Pripol® 1017 from Uniqema, a mixture of 75-80% of dimers and 18-22% of trimers with about 1-3% of fatty acid monomers, Pripol® 1048 from Uniqema, a 50/50% mixture of dimers/trimers, Pripol® 1013 from Uniqema, a mixture of 95-98% of dimers and 2-4% of trimers with a maximum of 0.2% of fatty acid monomers, Pripol® 1006 from Uniqema, a mixture of 92-98% of dimers and a maximum of 4% of trimers with a maximum of 0.4% of fatty acid monomers, Pripol® 1040 from Uniqema, a mixture of fatty acid dimers and trimers with at least 75% of trimers and less than 1% of fatty acid monomers, Unidyme® 60 from Arizona Chemicals, a mixture of 33% of dimers and 67% of trimers with less than 1% of fatty acid monomers, Unidyme® 40 from Arizona Chemicals, a mixture of 65% of dimers and 35% of trimers with less than 1% of fatty acid monomers, Unidyme® 14 from Arizona Chemicals, a mixture of 94% of dimers and less than 5% of trimers and other higher oligomers with about 1% of fatty acid monomers, Empol® 1008 from Cognis, a mixture of 92% of dimers and 3% of higher oligomers, essentially trimers, with about 5% of fatty acid monomers, Empol® 1018 from Cognis, a mixture of 81% of dimers and 14% of higher oligomers, essentially trimers, with about 5% of fatty acid monomers, Radiacid® 0980 from Oleon, a mixture of dimers and trimers with at least 70% of trimers, Radiacid® 0950 from Oleon, a mixture of 79-85% of dimers and 13-19% of trimers of a fatty acid with about 1-3% of fatty acid monomers.

The Pripol®, Unidyme®, Empol® and Radiacid° products comprise monomers of $C_{18}$ fatty acids and oligomers of fatty acids corresponding to multiples of $C_{18}$.

According to one particular embodiment, the mixture of dicarboxylic acid and tricarboxylic acid can be partially or totally replaced with a derivative of diacid(s) and triacid(s), this derivative being chosen from an acid salt, an acid ester and an acid chloride.

By way of example of an ester, mention may be made of a methyl, ethyl or isopropyl ester of a fatty acid as defined above.

A preferred fatty acid ester is a methyl ester of a fatty acid, and in particular a methyl ester of a fatty acid dimer or of a mixture of oligomers of fatty acids as defined above.

By way of example of a fatty acid chloride, mention may be made of sebacoyl chloride.

For its part, compound (B) bears at least one reactive group which can in particular be chosen from alcohol or primary or secondary amine groups. As a variant, compound (B) may bear at least two such identical or different groups. According to the invention, compound (B) preferably bears at least one primary amine function.

In the case in particular where the reactive group of compound (B) is capable of reacting both with the first and second functions of compound (A), it is preferable, in the first step of the process, for the ratio of the number of reactive groups of compound (B) to the sum of the functions of compound (A) to range from 0.05 to 0.8 and preferably from 0.15 to 0.7.

Compound (B) can thus correspond to any one of formulae (B1) to (B5):

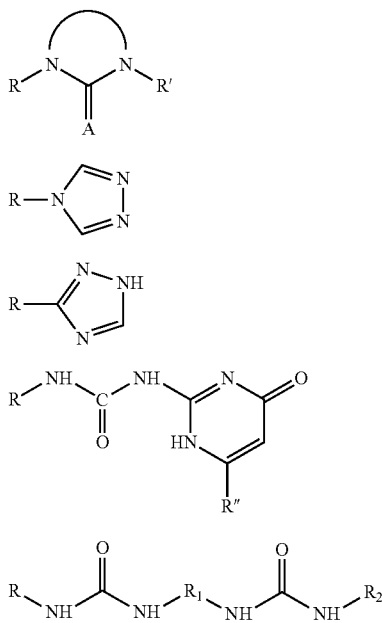

where:
R denotes a unit containing at least one reactive function,
R' denotes a hydrogen atom,
R", R¹ and R² denote any groups,
A denotes an oxygen or sulfur atom or an —NH group, preferably an oxygen atom.

Preferred examples of compounds (B) are (2-aminoethyl) imidazolidone (UDETA), 1-(2-[(2-aminoethyl)amino]ethyl) imidazolidone (UTETA), 1-[2-({2-[(2-aminoethyl)amino]ethyl}amino)ethyl]imidazolidone (UTEPA), N-(6-aminohexyl)-N'-(6-methyl-4-oxo-1,4-dihydropyrimidin-2-yl)urea (UPy), 3-amino-1,2,4-triazole and 4-amino-1,2,4-triazole. UDETA is preferred for use in the present invention.

Some of these compounds can be obtained by reacting urea with a polyamine. For example, UDETA, UTETA and UTEPA can respectively be prepared by reacting urea with diethylenetriamine (DETA), triethylenetetramine (TETA) and tetraethylenepentamine (TEPA).

The reacting of compound (B) with compound (A) can, for example, be carried out at a temperature included between 20 and 200° C., preferably between 130 and 170° C., for a period of time ranging from 1 to 15 h, for example from 3 to 9 h, advantageously with stirring and under an inert atmosphere.

This compound is then reacted, with an at least bifunctional compound (C), in such a way that the functions of (C) react with the second functions, i.e. the remaining reactive functions, of compound (A). In this step, the use of catalytic conditions capable of resulting in a homopolymerization of compound (C) will be avoided.

Compound (C) bears at least two identical or different functions chosen in particular from epoxy, alcohol and amine functions.

Compound (C) may be a diepoxide. It can thus be chosen from: bisphenol A diglycidyl ether, bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, epoxidized polyunsaturated fatty acids and epoxidized limonene; and mixtures thereof.

As a variant, compound (C) may be a polyepoxide containing at least three epoxide functions, chosen, for example, from: castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils and epoxidized limonene.

As another variant, compound (C) may be a diol. In this case, compound (C) may be chosen from: ethylene glycol, propylene glycol, tetramethylene glycol, hexamethylene glycol, octanediol, nonanediol, decanediol, diethylene glycol, dipropylene glycol, triethylene glycol, tetraethylene glycol, polyethylene glycol, polypropylene glycol, polytetramethylene glycol, polyesters comprising hydroxyl ends, polybutadienes comprising hydroxyl ends, polydimethylsiloxanes comprising hydroxyl ends, polyisobutylenes comprising hydroxyl ends, polybutadiene-co-acrylonitrile copolymers comprising hydroxyl ends, dimer diols resulting from fatty acids and mixtures thereof.

According to another possibility, compound (C) may be a polyol containing at least three alcohol functions. Examples of such compounds are in particular: sugars such as sorbitol, pentaerythritol, trimethylolpropane, and also glycerol and its ethoxylated and propoxylated derivatives, castor oil and dimer diols resulting from fatty acids, such as Pripol 2033 from Uniqema.

According to another possibility, compound (C) may be a polyamine. The polyamine may be any compound bearing at least two amine functions, preferably primary amine functions, and preferably a compound of formula (I):

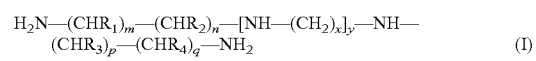

$$H_2N-(CHR_1)_m-(CHR_2)_n-[NH-(CH_2)_x]_y-NH-(CHR_3)_p-(CHR_4)_q-NH_2 \quad (I)$$

in which:
$R_1, R_2, R_3$ and $R_4$ independently denote a hydrogen atom or a $C_1$-$C_6$ alkyl group such as a methyl group,
m, n, p and q independently denote an integer ranging from 1 to 3,
x denotes an integer ranging from 1 to 6,
y denotes an integer ranging from 0 to 2.

In formula (I) above, at least one, and preferably all, of the conditions below are met:
$R_1, R_2, R_3$ and $R_4$ denote a hydrogen atom,
m+n is equal to 2, 3 or 6, preferably to 2,
p+q is equal to 2, 3 or 6, preferably to 2,
x denotes an integer ranging from 2 to 4,
y is equal to 0 or 1, preferably to 0.

Preferred examples of polyamines of formula (I) are DETA (diethylenetriamine), TETA (triethylenetetramine), TEPA (tetraethylenepentamine) and dihexylenetriamine.

As a variant, the polyamine may be a linear alkylene diamine containing 3 to 40 carbon atoms, such as cadaverine, putrescine, hexamethylenediamine or 1,12-diaminododecane, or a cyclic alkylene diamine such as isophorone diamine.

The reaction of the polyamine (compound (C)) with the mixture of dicarboxylic/tricarboxylic acid or their salt, ester or acid chloride derivatives, that is used (compound (A)), can, for example, be carried out at a temperature between 20 and 200° C., preferably between 140 and 180° C., for a period of time ranging from 1 to 24 h, for example from 6 to 8 h, advantageously with stirring and under an inert atmosphere.

In one preferred embodiment, compound (A) is a mixture of polycarboxylic acids, or salt, ester or acid chloride derivatives thereof, reacted with at least one compound (C) which is a polyamine, in a molar ratio of the amine functions to the acid functions of the dicarboxylic acid included between 0.95 and 0.0.2 and preferably between 0.85 and 0.3.

The supramolecular polymer used in the compositions which are subjects of the invention results from reacting compound (A) with compound (B) and with compound (C). These reactions can be carried out simultaneously or successively. When these reactions are carried out successively, the reaction of compound (A) with compound (B) will preferably be carried out first, but the reverse order is also possible. They can also be carried out either in distinct reactors, or in the same reactor, without it being necessary to provide for a washing or purification step after the first of these reactions.

It is preferable for the supramolecular polymer to also contain intermolecular hydrophobic bonds, advantageously due to interactions between alkyl groups borne by each of the trifunctional molecules described above. For the purpose of the invention, the term "alkyl" is intended to mean side groups ($C_nH_{2n+1}$) and not alkylene chains ($C_nH_{2n}$), for example. In a particularly preferred manner, each of these molecules comprises $C_6$-$C_{24}$ alkyl chains, advantageously in a greater number than said end associative groups. They can in particular be contributed by the compounds (A), in particular when they are trimers of fatty acids.

In one particular embodiment, the supramolecular polymer defined above is reacted with urea.

Thus, preferably, the product resulting from the reaction of at least one compound (A) with at least one compound (B) and at least one compound (C) is reacted with urea so as to constitute di(amidoethyl)urea, diamidotetraethyl triurea and/or urea junctions.

The reaction can, for example, be carried out at a temperature of from 110 to 180° C., preferably from 120 to 160° C., by performing a temperature ramp, for a period of time ranging from 30 minutes to 24 h, preferably for a period of time of from 1 to 6 hours, under an inert atmosphere and, advantageously, with stirring. Once again, this reaction can be carried out in a reactor separate from that or those used in the preceding step(s), or in the same reactor. It is therefore understood that all the steps of the process for obtaining the supramolecular polymer can be carried out in the same reactor, by successive addition of the reactants, thereby making the process particularly simple and economical.

The function of the urea, in this step, is to create additional associative groups, for example according to the following reaction schemes:

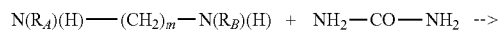

$N(R_A)(H)-(CH_2)_m-N(R_B)(H) + NH_2-CO-NH_2 \rightarrow$

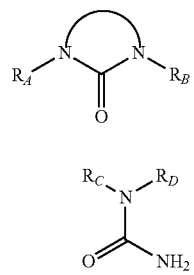

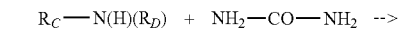

$R_C-N(H)(R_D) + NH_2-CO-NH_2 \rightarrow$

Compounds (A), (B) and (C) described above can be introduced, in the molten state, in the pulverulent or nonpulverulent solid state, or via the liquid route, for example in an aqueous solution or dispersion. However, they are preferably introduced in the pulverulent solid state or in the molten state in order to avoid recourse to solvents that need to be subsequently removed.

When the process for obtaining the supramolecular copolymer comprises a final step of reacting with urea, therefore in addition to the reactions of (A) with (B) and (C), compound (C) is preferably a polyamine as described above, and compound (C) is particularly preferably diethylenetriamine or DETA.

The proportions of (A), (B) and (C) used in the process for synthesizing the supramolecular polymer, and also their nature, and the choice of whether or not to carry out an additional step of reacting with urea, determine the mechanical characteristics of said polymer. Thus, it is possible to obtain mechanical properties ranging from those of an elastomer to those of a plastomer. These parameters also determine the solubility properties of said polymer. Thus, it is possible for the supramolecular polymer to be completely or partially soluble in polar solvents such as alcohols.

According to one embodiment of the invention, the average number of associative groups per molecule is at least 1.2, preferably at least 2, or even at least 2.2.

The supramolecular polymers used in the compositions which are subjects of the invention advantageously have elastomeric properties, such as that of rubber elasticity or hyperelasticity, i.e. the property of being able to be subjected to a uniaxial strain at its use temperature, for example at ambient temperature, of at least 20%, for example for 15 minutes, and of regaining, once this stress has been released, essentially the initial dimension thereof, for example, with a set of less than 5% of the initial dimension thereof.

These supramolecular polymers may, moreover, be capable of self-healing after cutting, and may have, after the edges of the cut have been brought back into contact, properties that are still elastomeric, allowing them to undergo, for example, a tensile strain of at least 20%, or even of at least 100% before break, and to regain essentially the initial dimensions thereof once the stress has been released, with, for example, a set of less than 10% of the initial dimension thereof.

The supramolecular polymers defined above are materials in the form of soft solids, that it is necessary to extract from the reactor having been used to synthesize them. According to one preferred variant, the product can be extracted from the reactor in the liquid and "final" state by means of a heat treatment in an incubator, an oven, heating strips or any other suitable equipment, until the product has been converted into a soft solid. The supramolecular polymer may be cut up or milled, in particular cold, for example in a hammer mill, bead mill, ball mill, grinding wheel mill or knife mill, and then washed, for example with water, and optionally formed, in particular by hot-pressing, calendering, thermoforming or any other method.

Preferably, the supramolecular polymer, optionally washed with water, is cut up coarsely into strips or into pieces, and then mixed with the elastomer.

Additives

The composition which is the subject of the invention can be used as it is or in single-phase or multi-phase mixtures with one or more compounds, such as oil fractions, solvents, inorganic and organic fillers, plasticizers, tackifying resins, processing aids, lubricants, antioxidants, antiradiation (anti-UV) additives, pigments and/or dyes.

In particular, additives capable of being added to the composition according to the invention are in particular:
- lubricants, such as stearic acid and esters thereof, waxy esters, polyethylene waxes, paraffin or acrylic lubricants,
- dyes,
- inorganic or organic pigments, such as those described in the document "Plastics Additives and Modifiers Handbook, Section VIII, Colorants", J. Edenbaum, Ed., Van Nostrand, pages 884-954. By way of examples of pigments that can be used, mention may be made of carbon black, titanium dioxide, clay, metal particles or treated mica particles of the Iriodin® brand sold by Merck,
- plasticizers, such as esters, for instance phthalates or adipates, ethers, for instance dimethyl isosorbide, amides,
- heat and/or UV stabilizers, such as tin stearate, lead stearate, zinc stearate, cadmium stearate, barium stearate or sodium stearate, including Thermolite® from Arkema,
- costabilizers, such as epoxidized natural oils,
- antioxidants, for example phenolic, sulfur-comprising or phosphite antioxidants,
- fillers or reinforcing agents, in particular cellulose fillers, talc, calcium carbonate, mica or wollastonite, glass or metal oxides or hydrates, carbon black or silica,
- antistatic agents,
- fungicides and biocides,
- blowing agents used for the manufacture of expanded components, such as azodicarbonamides, azobisisobutyronitrile or diethyl azobisisobutyrate,
- flame retardants, including antimony trioxide, zinc borate and brominated or chlorinated phosphate esters,
- solvents, and
- mixtures thereof.

The composition which is the subject of the invention can in particular be used for manufacturing leaktight seals, stoppers or septa, toys, thermal insulating materials or soundproofing materials, tires, tire treads, or any other part of a tire, cables, sheaths, soles for footwear, packaging, coatings (paints, films, cosmetic products), such as anticorrosion coatings, patches (cosmetic or dermopharmaceutical) or other systems for trapping and releasing active agents, dressings, flexible hose clips, vacuum tubes, pipes and flexible hoses for conveying fluids, and generally components which have to exhibit good tear and/or fatigue strength, rheological additives, additives for bitumen or additives for hot-melts and adhesives.

A subject of the invention is therefore also the use of the composition which is the subject of the invention for the abovementioned purposes.

The invention will be understood more clearly in the light of the following examples, given solely for the purposes of illustration and which are not intended to restrict the scope of the invention, defined by the appended claims.

EXAMPLES

Example 1

Preparation of a Supramolecular Polymer

First Step:

Substep a: 76 g of Empol® 1016 [acid number 194, degree of monomer (4%), dimer (80%), trimer (16%)] and 6.7 g of purified UDETA (52 mmol), i.e. an [$NH_2$]/[COOH] ratio of 0.2, are introduced into a reactor having a diameter of 60 mm and a nominal volume of 500 ml, fitted with a bottom valve, a device for regulating temperature by means of a heat-transfer fluid, a mechanical stirrer, a dropping funnel, a Dean-Stark apparatus and a gas inlet, preheated to 40° C. The temperature of the bath is brought to 150° C. for 8 hours under a stream of nitrogen of 500 ml/minute and with stirring at 280 rpm. During this step, infrared spectroscopy shows a decrease in the $\delta NH_2$ signal (1505 $cm^{-1}$), an increase in the $vC=O$ signal (1648 $cm^{-1}$) and the release of water vapor. It is decided to stop the reaction when there is no longer any release of water vapor (8 hours in the present example).

After this substep, the reaction product is stored at 50° C. in the reactor.

Substep b: The same assembly and the same conditions (nitrogen, stirring) as above are used. 10.7 g (104 mmol) of diethylenetriamine (purity 98%) are placed in the dropping funnel.

The body of the reactor is heated to 160° C. and the amine is added slowly, dropwise, intermittently over a total period of 3 h. The reaction is left to continue for a further 4 h at 160° C. During this second step, the same type of change as previously is observed by infrared spectroscopy. The end of the release of water vapor, which is here again observed, is used as criterion for stopping the reaction.

After this step, the product is collected via the bottom valve (86 g are collected) and stored at ambient temperature. It is in the form of a viscoelastic liquid which is strongly adhesive on many substrates, in particular on glass, on metal and on paper. The glass transition temperature measured by DSC (differential scanning calorimetry) is −11° C. Rheological measurements carried out in parallel plate geometry with an applied strain of 1% gave, at the stress frequency of 1 rad/s, the following results:

| T (° C.) | 25 | 35 | 50 | 70 | 90 |
|---|---|---|---|---|---|
| G' (Pa) | 33078 | 9812 | 1884 | 234 | 34 |
| G" (Pa) | 49311 | 17568 | 4695 | 947 | 225 |

Second Step:

67 g of the previous product and 6.1 g of urea are introduced into a large reactor (diameter 100 mm) having a nominal volume of 500 ml, fitted with a device for regulating temperature by means of a heat-transfer fluid, a mechanical stirrer and a gas inlet, preheated to 80° C. The stirring is regulated at 50 rpm and the temperature is brought to 135° C. After half an hour at this temperature, and throughout the rest of the process, a sizeable release of ammonia is observed by means of pH indicator paper. Throughout this step, the monitoring of the reaction by infrared spectroscopy reveals a decrease in the urea signal νC=O 1675 cm$^{-1}$.

The temperature is maintained at 135° C. for a total of two hours, then at 140° C. for 1 hour, then at 145° C. for one hour. At this stage, it is noted that the reaction mixture that was initially cloudy tends toward becoming transparent. One gram of water is added and the solution becomes cloudy again. The mixture is brought to 150° C. for approximately 1 h, during which time a decrease in the release of ammonia is noted.

The criterion for stopping the reaction is this time the fact that the product sets and attaches to the axis of the stirrer. As soon as this is the case, the product is recovered on the stirrer rod.

Forming:

The pieces obtained are placed in a plastic bag and ground cold with a hammer. The fragments, which are 1 to 2 mm in size, are washed by immersion in water for 72 h. In the water, the fragments subjected to the washing have a tendency to stick to one another. The sample, drained beforehand, is cut up again into pieces approximately 5 mm in size, which are placed in a mold consisting of a brass plate 1.6 mm thick pierced with a rectangular hole, placed between two sheets of non-stick paper. After a first pressing at 120° C. for 10 minutes (pressure applied 10 MPa), the film obtained displays irregularities in thickness which are corrected by adding material and repressing until a satisfactory appearance is obtained.

Example 2

Preparing an Elastomer/Supramolecular Polymer Mixture

Initial Mixing in an Internal Mixer

The desired proportions of each of the components of the elastomer/supramolecular polymer mixture are introduced, at ambient temperature, in such a way that the total weight of the products introduced does not exceed 70 g, into a Brabender N50 internal mixer fitted with a temperature probe and a torque meter, rotating at 50 rpm. In this example, the elastomer is a synthetic polyisoprene Natsyn 2200 from the company Goodyear, having a glass transition temperature of −63° C. plus or minus 2° C., measured in a Q 10 DSC apparatus from TA Instruments, at a ramp speed of 10° C./min, and the supramolecular polymer is that of Example 1. The mixture which, by self-heating will rise in temperature, is left to rotate for 5 to 10 min. During this time, the temperature has a tendency to stabilize at a value below 90° C., and the mechanical torque also reaches a stable value. After the mixing time, the mixer is stopped, and the resulting mixture is extracted therefrom.

Calendering

The resulting mixture is passed, at ambient temperature, through a Gumix roll mixer revolving at 11 rpm, until a cake that is as homogeneous as possible is obtained.

Obtaining Pressed Sheets

The calendered mixture is then cut up into pieces, and a metal mold that is 15×15 cm for a thickness of 2 mm is filled with these pieces. In order to facilitate demolding, two sheets of silicone paper (kraft silicone white, 120 g/m$^2$) are placed above and below the mold. The whole assembly is placed in a Gibitre Instruments® hydraulic press heated at 150-160° C. for a pressing time of 10 minutes, under a pressure of 200 bar. At the end of the pressing time, the press is cooled without releasing the pressure and, when the temperature reaches 35° C., the pressure is released and the press is opened so as to extract the pressed sheet.

Conditioning and Cutting Out Tensile Test Specimens

Tensile test specimens are directly cut out from the pressed sheet previously obtained, a type 5A dumb bell-shaped hole punch [according to standard: ISO 527], after having left said sheet to equilibrate in an air-conditioned room at a temperature of 21° C. (+/−2° C.) and a relative humidity of 50% (+/−10%).

A similar procedure is carried out in order to obtain test specimens of the two elastomers, the conventional one (natural rubber) and the supramolecular one, not mixed, as a reference. When fillers or additives are used, they are fed-in during the step of preparing the mixture in an internal mixer.

Tensile Mechanical Tests

The tensile tests are carried out on the type 5A test specimens conditioned as described above. These dumb bell-shaped test specimens measure 75 mm in length with a useable length, central rectangular prism part, of 25 mm for a width of 4 mm, and a thickness obtained for the sheet molding of 2 mm. The tension is exerted in an Instron 5565 tensile testing machine at a rate of displacement of the crosspiece of 500 mm/min. The machine is fitted with a force sensor and the gap between the jaws holding the test specimen is automatically recorded, after adjustment of the initial zero point before the beginning of the test. Curves of force as a function of displacement, or of nominal stress, defined as the force at the given time/displacement divided by the cross-section of the sample at the zero time/displacement, are obtained as a function of the displacement of the crosspiece or of the percentage strain, calculated as 100×(displacement at a given time−initial length)/(initial length). The values of tensile strength and of percentage strain at break of the sample are recorded. It is also possible to calculate the area under the curve of nominal stress relative to percentage strain. The resulting value is proportional to the energy applied in order to break the sample and is a measure of its breaking resilience or breaking strength.

Table I shows the values of nominal tensile strength, of strain at break and of area under the curve of stress relative to percentage strain for an elastomer which is a noncrosslinked synthetic polyisoprene, for a supramolecular polymer prepared according to Example 1 and for an equal-weight mixture (50/50% by weight) of these two products. The values correspond to means on 3 test specimens.

TABLE I

Mechanical properties of a mixture and of its components

| Product | Tensile strength (MPa) | Strain at break (%) | Area under the curve [MPa × 100 mm/mm] |
|---|---|---|---|
| Noncrosslinked polyisoprene | 0.65 | 469 | 207 |
| Supramolecular polymer | 1.45 | 275 | 209 |
| 50/50 mixture | 1.61 | 600 | 518 |

It may be noted that the mixture has better mechanical properties than those of its two components. Furthermore, the cold resistance of the supramolecular polymer is improved, since said polymer alone, i.e. in the absence of polyisoprene, becomes brittle at a temperature close to 0° C., whereas the mixture of table I remains flexible after several hours in a freezer at −15° C. The rate of springback after strain is also improved, compared with that of the supramolecular polymer alone. From a self-healing point of view, the 3 products of table I have the ability to partially repair themselves after they have been broken and the pieces have been stuck back together.

Example 3

Preparation of a Series of Elastomer (Polyisoprene)/Supramolecular Polymer Mixtures Having Various Compositions and in the Presence of 10% by Weight of Carbon Black Mixtures of various proportions of elastomer (synthetic polyisoprene) and of supramolecular polymer of Example 1 were prepared according to the procedure of Example 2, while adding 10% by weight, relative to the total mixture, of carbon black (Corax N550® from Degussa) during the step of mixing in an internal mixer. Tensile test specimens were prepared and conditioned and the tensile test described in Example 2 was carried out. table II shows the results obtained. The values correspond to means on 3 test specimens.

TABLE II

Mechanical properties of the mixtures and of their loaded components (the first number of the mixtures corresponds to the % by weight of polyisoprene and the second corresponds to the supramolecular polymer)

| Product | Tensile strength (MPa) | Strain at break (%) | Area under the curve [MPa × 100 mm/mm] |
|---|---|---|---|
| Noncrosslinked polyisoprene loaded with 10% N550 | 0.3 | 435 | 113 |
| Supramolecular polymer loaded with 10% N550 | 2.91 | 261 | 355 |
| 10/90 mixture loaded with 10% N550 | 2.94 | 319 | 457 |
| 30/70 mixture loaded with 10% N550 | 3.42 | 381 | 635 |
| 50/50 mixture loaded with 10% N550 | 2.21 | 521 | 626 |
| 70/30 mixture loaded with 10% N550 | 0.95 | 546 | 313 |
| 90/10 mixture loaded with 10% N550 | 0.37 | 526 | 164 |

It may be noted that the mixtures rich in supramolecular polymer (10 and 30% of polyisoprene) exhibit improved properties compared with the supramolecular polymer that is loaded, but without polyisoprene. In the case of the mixture containing 30% of polyisoprene, the improvement is particularly pronounced. Surprisingly, the introduction of 30% of polyisoprene (softer product, with a lower tensile strength than the supramolecular elastomer) significantly increases the tensile strength of the loaded supramolecular polymer. When the mixtures are enriched in noncrosslinked polyisoprene, the properties are very similar to those of the loaded, noncrosslinked polyisoprene reference, while at the same time remaining, in terms of fracture energy (which may reflect the balance obtained between the effects on the tensile strength and on the strain at break), superior to that of the reference not containing the supramolecular polymer.

From a self-healing point of view, all the mixtures of table I exhibit to varying extents the ability to partially repair themselves after they have broken and the pieces have been stuck back together.

Example 4

Preparation of a Series of Equal-Weight, Nonloaded Polyisoprene/Supramolecular Polymer Mixtures, at Various Degrees of Crosslinking with a Peroxide Crosslinking Agent Equal-weight mixtures of natural rubber and supramolecular polymer of Example 1 were prepared, according to the method described in Example 2, with the addition of various amounts of a peroxide crosslinking agent, Luperox DCP® sold by the company Arkema (dicumyl peroxide). The peroxide was added during the step of mixing in an internal mixer, during which step the mixture does not exceed the temperature of 90° C., and the crosslinking was carried out during the step of forming under a press. The crosslinking conditions were 15 minutes at 175° C. and 200 bar, under a press. The levels of addition of peroxide crosslinking agent were 0.07%, 0.35%, 0.7% and 1% of peroxide relative to the total of the polyisoprene/supramolecular polymer mixture. Tensile test specimens were prepared and conditioned as described in Example 2 and tensile tests were carried out. Table III shows the results obtained. The values correspond to means on 3 test specimens.

TABLE III

| Product | Tensile strength (MPa) | Strain at break (%) | Area under the curve [MPa × 100 mm/mm] |
|---|---|---|---|
| 50/50 mixture plus 0.07% of peroxide | 3.38 | 793 | 1191 |
| 50/50 mixture plus 0.35% of peroxide | 8 | 857 | 2550 |
| 50/50 mixture plus 0.7% of peroxide | 7.1 | 675 | 1634 |
| 50/50 mixture plus 1% of peroxide | 6.13 | 593 | 1275 |
| Supramolecular polymer alone plus 0.07% of peroxide | 1.42 | 342 | 180 |
| Supramolecular polymer alone plus 0.35% of peroxide | 2 | 355 | 235 |
| Supramolecular polymer alone plus 0.7% of peroxide | 1.82 | 274 | 184 |
| Supramolecular polymer alone plus 1% of peroxide | 1.62 | 245 | 162 |
| Polyisoprene plus 0.07% of peroxide | 1.71 | 1034 | 746 |
| Polyisoprene plus 0.35% of peroxide | 2.88 | 718 | 865 |

TABLE III-continued

| Product | Tensile strength (MPa) | Strain at break (%) | Area under the curve [MPa × 100 mm/mm] |
|---|---|---|---|
| Polyisoprene plus 0.7% of peroxide | 4.51 | 719 | 1273 |
| Polyisoprene plus 1% of peroxide | 5.26 | 643 | 1351 |

It may be noted that the addition of a peroxide and the hot-crosslinking of the equal-weight mixture with this peroxide has a very substantial effect on the mechanical properties. Compared with the 50/50 mixture of Example 2, crosslinking very much improves the mechanical properties. This effect of the crosslinking, as expected, is observed on the polyisoprene alone: after a considerable increase in the tensile strength and in the strain at break for a low degree of crosslinking, compared with the noncrosslinked polyisoprene of Example 2, the tensile strength changes by increasing and the strain at break changes by decreasing, as a function of the degree of crosslinking. On the supramolecular polymer, on the other hand, the effect of the peroxide crosslinking agent is much more modest and changes differently: tensile strength, strain at break and rupture energy go through an optimum. It is this tendency to go through an optimum that is also observed for the crosslinked 50/50 mixture, at the same degree of crosslinking agent of 0.35%.

From the point of view of self-healing, all the mixtures of Table I have the ability to partially repair themselves after they have broken and the pieces have been stuck back together.

The cold resistance of the supramolecular elastomer is, as for the noncrosslinked mixtures, better in the crosslinked mixtures than for the crosslinked or noncrosslinked supramolecular elastomer alone. Finally, the rate of springback is substantially improved for the crosslinked mixtures, compared with that of the supramolecular elastomer alone.

The invention claimed is:

1. A composition comprising:
   (i) at least one elastomer which is selected from the group consisting of natural rubber and a synthetic polymer or copolymer resulting from the polymerization of a majority of monomers with a molecular weight of less than 400 g/mol;
   and
   (ii) at least one supramolecular polymer obtainable by reacting at least one at least trifunctional compound (A) bearing first and second functions, with:
      at least one compound (B) bearing, firstly, at least one reactive group capable of reacting with the first functions of (A) and, secondly, at least one associative group; and
      at least one at least bifunctional compound (C) of which the functions are capable of reacting with the second functions of compound (A) in order to form one or more bridges selected from the group consisting of ester, thioester and amide bridges.

2. The composition as claimed in claim 1, wherein the elastomer is selected from the group consisting of polybutadiene, synthetic polyisoprene, polychloroprene, polyisobutylene, block copolymers of polybutadiene and of isoprene with styrene, poly(styrene-b-butadiene) (SB), poly(styrene-b-butadiene-b-styrene) (SBS), poly(styrene-b-isoprene-b-styrene) (SIS), poly(styrene-b-(isoprene-stat-butadiene)-b-styrene), poly(styrene-b-isoprene-b-butadiene-b-styrene) (SIBS), hydrogenated SBS (SEBS), poly(styrene-b-butadiene-b-methyl methacrylate) (SBM), hydrogenated poly(styrene-b-butadiene-b-methyl methacrylate) (SEBM), poly(methyl methacrylate-b-butyl acrylate-b-methyl methacrylate) (MAM), poly(styrene-b-butyl acrylate-b-styrene) (SAS), random copolymers of butadiene with styrene (SBR), random copolymers of butadiene with acrylonitrile (NBR), hydrogenated random copolymers of butadiene with styrene (SBR), hydrogenated random copolymers of butadiene with acrylonitrile, butyl rubbers, halogenated rubbers, polyethylenes, polypropylenes, silicone elastomers of general formula —(Si(R)(CH$_3$)—O)$_n$— with CH$_3$ and R bonded to the silicon atom and the latter bonded to the oxygen atom, wherein R is a methyl, phenyl, vinyl, trifluoropropyl or 2-cyanoethyl radical, ethylene-vinyl alcohol copolymers, ethylene-propylene and ethylene-propylene-diene (EPDM) copolymers, copolymers of ethylene with acrylic and vinyl monomers, copolymers of ethylene, vinyl acetate and maleic anhydride, copolymers of ethylene and acrylic ester, copolymers of ethylene, acrylic ester and maleic anhydride, copolymers of ethylene, acrylic ester and functional acrylic ester, flexible acrylic polymers, flexible acrylic copolymers, diene elastomers, polyamide/polyether multiblock copolymers, elastomers based on polyesters and on polyurethane (PUR), recycled rubbers based on thermoplastic elastomers, recycled rubbers based on recycled crosslinked rubber, and also blends thereof.

3. The composition as claimed in claim 1, also comprising at least one crosslinking agent or a mixture of crosslinking agents.

4. The composition as claimed in claim 1, wherein compound (A) is a trimer of at least one of the following acids: undecylenic acid, myristoleic acid, palmitoleic acid, oleic acid, linoleic acid, linolenic acid, ricinoleic acid, eicosenoic acid, docosenoic acid, eicosapentaenoic acid and docosahexaenoic acid.

5. The composition as claimed in claim 4, wherein compound (A) is a mixture of a trimer of a fatty acid and of dicarboxylic acid selected from the group consisting of a linear alkyldicarboxylic acid and a branched alkyl dicarboxylic acid.

6. The composition as claimed in claim 1, wherein compound (B) corresponds to one of formulae (B1) to (B5):

(B1)

(B2)

(B3)

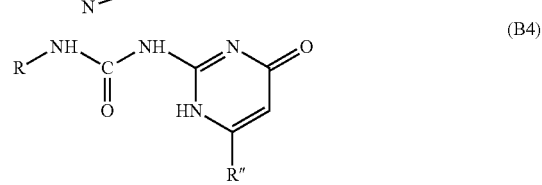
(B4)

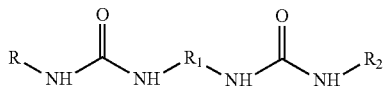

(B5)

where:
R denotes a unit containing at least one reactive function,
R' denotes a hydrogen atom,
R", $R_1$ and $R_2$ denote any group,
A denotes an oxygen or sulfur atom or an —NH group.

7. The composition as claimed in claim 6, wherein compound (B) is selected from the group consisting of (2-aminoethyl)imidazolidone (UDETA), 1-(2-[(2-aminoethyl)amino]ethyl)imidazolidone (UTETA), 1-[2-({2-[(2-aminoethyl)amino]ethyl}amino)ethyl]imidazolidone (UTEPA), N-(6-aminohexyl)-N'-(6-methyl-4-oxo-1,4-dihydropyrimidin-2-yl)urea (UPy), 3-amino-1,2,4-triazole and 4-amino-1,2,4-triazole.

8. The composition as claimed in claim 1, wherein compound (C) bears at least two identical or different functions selected from the group consisting of epoxy, alcohol and amine functions.

9. The composition as claimed in claim 8, wherein compound (C) corresponds to formula (I):

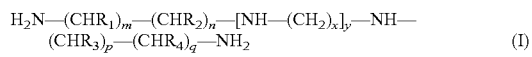

in which:
$R_1$, $R_2$, $R_3$ and $R_4$ independently denote a hydrogen atom or a $C_1$-$C_6$ alkyl group,
m, n, p and q independently denote an integer ranging from 1 to 3,
x denotes an integer ranging from 1 to 6,
y denotes an integer ranging from 0 to 2.

10. The composition as claimed in claim 9, wherein, in formula (I), at least one of the conditions below are met:
$R_1$, $R_2$, $R_3$ and $R_4$ denote a hydrogen atom,
m+n is equal to 2, 3 or 6,
p+q is equal to 2, 3 or 6,
x denotes an integer ranging from 2 to 4,
y is equal to 0 or 1.

11. The composition as claimed in claim 10, wherein compound (C) is selected from the group consisting of DETA (diethylenetriamine), TETA (triethylenetetramine), TEPA (tetraethylenepentamine), dihexylenetriamine, cadaverine, putrescine, hexamethylenediamine, 1,12-diaminododecane, and a cyclic alkylene diamine.

12. The composition as claimed in claim 1, wherein the supramolecular polymer is reacted with urea.

13. A process for producing a composition, said process comprising:
at least one step (a) of mixing an elastomer as defined in claim 1 and a supramolecular polymer as defined in claim 1; and
at least one step (b) of adding a crosslinking agent or a mixture of crosslinking agents, said step being carried out during or after step (a); then
a hot-crosslinking step (c).

14. The composition as claimed in claim 4, wherein compound (A) is a mixture of a trimer of a fatty acid and of dicarboxylic acid selected from the group consisting of glutaric acid, adipic acid, pimelic acid, suberic acid, azelaic acid, sebacic acid undecanedioic acid, dodecanedioic acid, brassylic acid, tetradecanedioic acid, pentadecanedioic acid, thapsic acid, octadecanedioic acid, and 3,3-dimethylglutaric acid.

15. The composition as claimed in claim 6, wherein A denotes an oxygen atom.

16. The composition as claimed in claim 10, wherein all of the conditions are met.

17. The composition as claimed in claim 9, wherein, in formula (I), at least one of the conditions below are met:
$R_1$, $R_2$, $R_3$ and $R_4$ denote a hydrogen atom,
m+n is equal to 2,
p+q is equal to 2,
x denotes an integer ranging from 2 to 4,
y is equal to 0.

18. The composition as claimed in claim 17, wherein all of the conditions are met.

19. The composition as claimed in claim 1, wherein the at least one associative group is selected from imidazolidinyl groups, triazolyl groups, triazinyl groups, bisureyl groups and ureidopyrimidyl groups.

20. The composition as claimed in claim 1, wherein the supramolecular polymer has an average number of associative end groups per molecule of at least 3.

* * * * *